US012750827B2

(12) United States Patent
Xu et al.

(10) Patent No.: US 12,750,827 B2

(45) Date of Patent: Sep. 29, 2026

(54) SYSTEMS AND METHODS FOR MANAGING UPLINK TRANSMISSION AND CROSSLINK INTERFERENCE MEASUREMENT

(71) Applicant: QUALCOMM Incorporated, San Diego, CA (US)

(72) Inventors: Huilin Xu, Temecula, CA (US); Qunfeng He, San Diego, CA (US); Yuwei Ren, Beijing (CN); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 310 days.

(21) Appl. No.: 18/580,471

(22) PCT Filed: Sep. 21, 2021

(86) PCT No.: PCT/CN2021/119486

§ 371 (c)(1),
(2) Date: Jan. 18, 2024

(87) PCT Pub. No.: WO2023/044598

PCT Pub. Date: Mar. 30, 2023

(65) Prior Publication Data

US 2025/0008492 A1 Jan. 2, 2025

(51) Int. Cl.
*H04L 5/00* (2006.01)
*H04W 72/0446* (2023.01)
*H04W 72/21* (2023.01)

(52) U.S. Cl.
CPC ....... *H04W 72/0446* (2013.01); *H04W 72/21* (2023.01)

(58) Field of Classification Search
None
See application file for complete search history.

(56) References Cited

U.S. PATENT DOCUMENTS

| | | | | |
|---|---|---|---|---|
| 11,196,493 B2 * | 12/2021 | Hwang | ................ | H04B 17/327 |
| 11,277,213 B2 * | 3/2022 | Xu | ........................ | H04L 5/0092 |
| 2017/0325117 A1 * | 11/2017 | Li | ........................ | H05K 1/0253 |
| 2020/0389805 A1 * | 12/2020 | Kim | ...................... | H04W 72/23 |
| 2021/0067991 A1 * | 3/2021 | Zhu | ......................... | H04W 8/24 |

(Continued)

FOREIGN PATENT DOCUMENTS

| | | |
|---|---|---|
| WO | 2020143706 | 7/2020 |
| WO | 2020252339 A1 | 12/2020 |

OTHER PUBLICATIONS

International Search Report and Written Opinion—PCT/CN2021/119486—ISA/EPO—Apr. 7, 2022.

*Primary Examiner* — Sithu Ko

(74) *Attorney, Agent, or Firm* — Harrity & Harrity, LLP

(57) ABSTRACT

A method of wireless communication performed by a user equipment (UE) includes: receiving an assigned slot format from a network, the slot format including a plurality of symbols, a first subset of the symbols being designated for uplink, a second subset of the symbols being designated for downlink, and a third subset of the symbols being designated as flexible; and performing an uplink transmission on a first symbol of the third subset, wherein the first symbol of the third subset is configured for crosslink interference (CLI) measurement.

30 Claims, 9 Drawing Sheets

(56) References Cited

U.S. PATENT DOCUMENTS

| | | | | |
|---|---|---|---|---|
| 2021/0067992 | A1* | 3/2021 | Kusashima | H04W 24/08 |
| 2022/0095144 | A1* | 3/2022 | Ren | H04W 24/02 |
| 2022/0124533 | A1* | 4/2022 | Li | H04W 8/22 |
| 2023/0147579 | A1* | 5/2023 | Go | H04L 1/08 370/329 |
| 2024/0114489 | A1* | 4/2024 | Liu | H04W 72/231 |

* cited by examiner

SYSTEMS AND METHODS FOR MANAGING UPLINK TRANSMISSION AND CROSSLINK INTERFERENCE MEASUREMENT

CROSS-REFERENCE TO RELATED APPLICATIONS

The present application is a 35 U.S.C. 371 National Phase entry of Patent Cooperation Treaty (PCT) Application No. PCT/CN2021/119486, filed Sep. 21, 2021, which is hereby incorporated by reference in its entirety as if fully set forth below and for all applicable purposes.

TECHNICAL FIELD

This application relates to wireless communication systems, and more particularly to techniques to handle collision between crosslink interference measurement and uplink transmissions.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands.

Some current NR protocols specify that the UE is not expected to handle a collision between uplink (UL) transmission and crosslink interference (CLI) measurement; instead, when a symbol in a slot is configured for both UL transmission and CLI measurement the UE is expected to perform the CLI measurement and not to perform the UL transmission. Such current design essentially prioritizes CLI measurement over UL transmission. In other words, once a CLI measurement resource is configured, the network must guarantee that no configured, scheduled, or triggered UL transmission will occur in the CLI measurement occasions. However, when the number of aggressors to be measured by CLI is large, that may reduce a number of UL opportunities for the UE. Such protocols may provide for a simple UE implementation, but prioritizing interference measurement over regular UL transmission is not always reasonable, as communication may be more highly valued than are the benefits of interference measurement. What is needed in the art is techniques to better handle the collision between UL transmissions and CLI measurement.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment (UE) includes: receiving an assigned slot format from a network, the slot format including a plurality of symbols, a first subset of the symbols being designated for uplink, a second subset of the symbols being designated for downlink, and a third subset of the symbols being designated as flexible; and performing an uplink transmission on a first symbol of the third subset, wherein the first symbol of the third subset is configured for crosslink interference (CLI) measurement.

In another aspect, a UE includes: a transceiver configured to communicate with a network; and a processor configured to interface with the transceiver, wherein the processor is further configured to: receive an assigned slot format from the network, the slot format including a plurality of symbols, a first subset of the symbols being designated for uplink, a second subset of the symbols being designated for downlink, and a third subset of the symbols being designated as flexible; and perform an uplink transmission on a first symbol of the third subset, wherein the first symbol of the third subset is before and adjacent a second symbol that is configured for crosslink interference (CLI) measurement.

In another aspect, a UE includes: means for communicating wirelessly with a network; and means for controlling the communicating means, wherein controlling means further includes: means for receiving an assigned slot format from the network, the slot format including a plurality of symbols, a first subset of the symbols being designated for uplink, a second subset of the symbols being designated for downlink, and a third subset of the symbols being designated as flexible; and means for performing a crosslink interference (CLI) measurement on a first symbol of the first subset.

In another aspect, a non-transitory computer-readable medium having program code recorded thereon includes: code for receiving an assigned slot format from a network, the slot format including a plurality of symbols, a first subset of the symbols being designated for uplink, a second subset of the symbols being designated for downlink, and a third subset of the symbols being designated as flexible; code for receiving information from the network configuring a first symbol of the third subset for crosslink interference (CLI) measurement; and code for performing an uplink transmission on the first symbol of the third subset.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
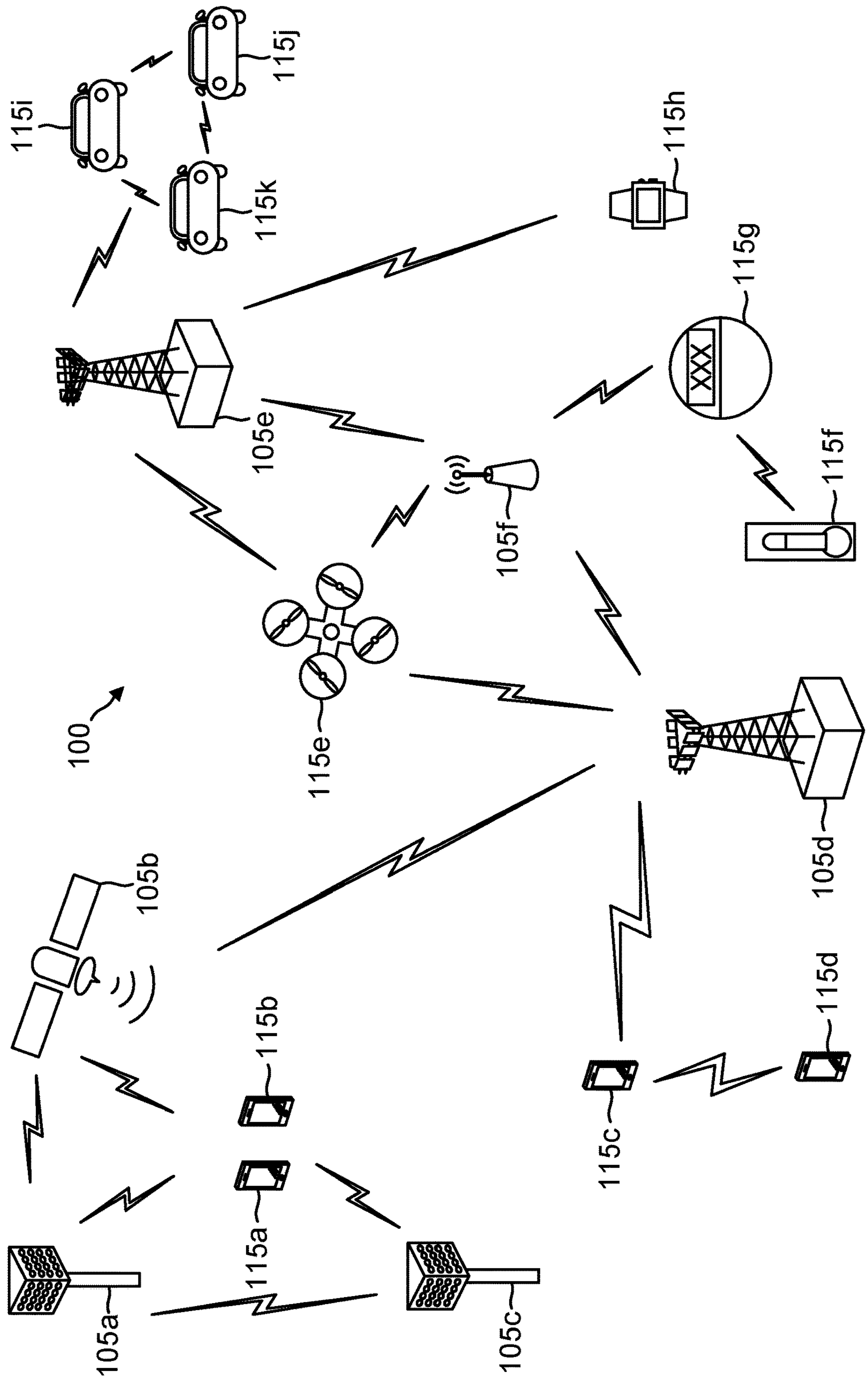
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

As described in more detail below, various implementations include methods of wireless communication, apparatuses, and non-transitory computer-readable media that provide for enhanced handling of collision between uplink (UL) transmission and crosslink interference (CLI) measurement in time division duplex (TDD) systems. In a first example, a UE is allowed to, and is configured to, perform the UL transmission when the particular symbol is configured for both UL and CLI. This may be true whether the UL is configured semi-statically or dynamically. In another example, a UE may be allowed to, and configured to, perform the UL transmission in a symbol immediately preceding or immediately following a symbol in which CLI is measured. In another example, the UE is allowed to, and configured to, measure CLI within a UL symbol in an instance in which the UE may not have any signals to transmit. Such example embodiments may add flexibility to a UE, thereby allowing a UE to have more UL opportunities, without adding much or any complexity to the UE operation. These functions and advantages are described in more detail below.

This disclosure relates generally to wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/$km^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/$km^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing (SCS) may occur with 15 kHz, for example over 5, 10, 20 MHZ, and the like bandwidth (BW). For other various outdoor and small cell coverage deployments of TDD greater than 3 GHZ, subcarrier spacing may occur with 30 kHz over a 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs may allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink (UL) and downlink (DL) to meet the current traffic needs.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used. The actions of FIG. 7 may be performed by any of BSs 105.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*b*, 105*d*, and 105*e* may be regular macro BSs, while the BSs 105*a* and 105*c* may be macro BSs enabled with one of three dimension (3D), full dimension (FD), or massive MIMO. The BSs 105*a* and 105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

Now returning to FIG. 1, in operation, the BSs 105*a* and 105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a* and 105*c*, as well as small cell, the BS 105*f*. The macro BS 105*d* may also transmit multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115*i*, 115*j*, or 115*k* and other UEs 115, and/or vehicle-to-infrastructure (V2I) communications between a UE 115*i*, 115*j*, or 115*k* and a BS 105. Additionally, BS 105*b* is shown as a non-terrestrial network (NTN) resource, such as a satellite that orbits the earth. In this example, BS 105*b* may include multiple antenna arrays, each array forming a relatively fixed beam. BS 105*b* may be configured as a single cell with multiple beams and BWPs, as explained in more detail below.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple bandwidth parts (BWPs) (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network. The BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel.

In some aspects, the network 100 may operate over a high frequency band, for example, in a frequency range 1 (FR1) band or a frequency range 2 (FR2) band. FR1 may refer to frequencies in the sub-6 GHz range and FR2 may refer to frequencies in the mmWave range. To overcome the high path-loss at high frequency, the BSs 105 and the UEs 115 may communicate with each other using directional beams. For instance, a BS 105 may transmit SSBs by sweeping across a set of predefined beam directions and may repeat the SSB transmissions at a certain time interval in the set of beam directions to allow a UE 115 to perform initial network access. In the example of NTN resource 105*b*, it may transmit SSBs on each of its beams at scheduled times, even if the beams do not steer. In some instances, each beam and its corresponding characteristics may be identified by a beam index. For instance, each SSB may include an indication of a beam index corresponding to the beam used for the SSB transmission.

The UE 115 may determine signal measurements, such as reference signal received power (RSRP) and/or reference signal received quality (RSRQ), for the SSBs at the different beam directions and select a best DL beam. The UE 115 may indicate the selection by transmitting a physical random access channel (PRACH) signal (e.g., MSG1) using PRACH resources associated with the selected beam direction. For instance, the SSB transmitted in a particular beam direction or on a particular beam may indicate PRACH resources that may be used by a UE 115 to communicate with the BS 105 in that particular beam direction. After selecting the best DL beam, the UE 115 may complete the random access procedure (e.g., the 4-step random access or the 2-step random access) and proceed with network registration and normal operation data exchange with the BS 105. In some instances, the initially selected beams may not be optimal or the channel condition may change, and thus the BS 105 and the UE 115 may perform a beam refinement procedure to refine a beam selection. For instance, BS 105 may transmit CSI-RSs by sweeping narrower beams over a narrower angular range and the UE 115 may report the best DL beam to the BS 105. When the BS 105 uses a narrower beam for transmission, the BS 105 may apply a higher gain, and thus may provide a better performance (e.g., a higher signal-noise-ratio (SNR)). In some instances, the channel condition may degrade and/or the UE 115 may move out of a coverage of an initially selected beam, and thus the UE 115 may detect a beam failure condition. Upon detecting a beam failure, the UE 115 may perform beam handover.

In some aspects, the network 100 may be an IoT network and the UEs 115 may be IoT nodes, such as smart printers, monitors, gaming nodes, cameras, audio-video (AV) production equipment, industrial IoT devices, and/or the like. The transmission payload data size of an IoT node typically may be relatively small, for example, in the order of tens of bytes. In some aspects, the network 100 may be a massive IoT network serving tens of thousands of nodes (e.g., UEs 115) over a high frequency band, such as a FR1 band or a FR2 band.

Various embodiments may include the UEs 115 having software and/or hardware logic to handle UL and CLIA collisions differently than in previous systems. For instance, the UEs 115 may be implemented with functionality, such as described in FIGS. 5-8.

Figure 2:
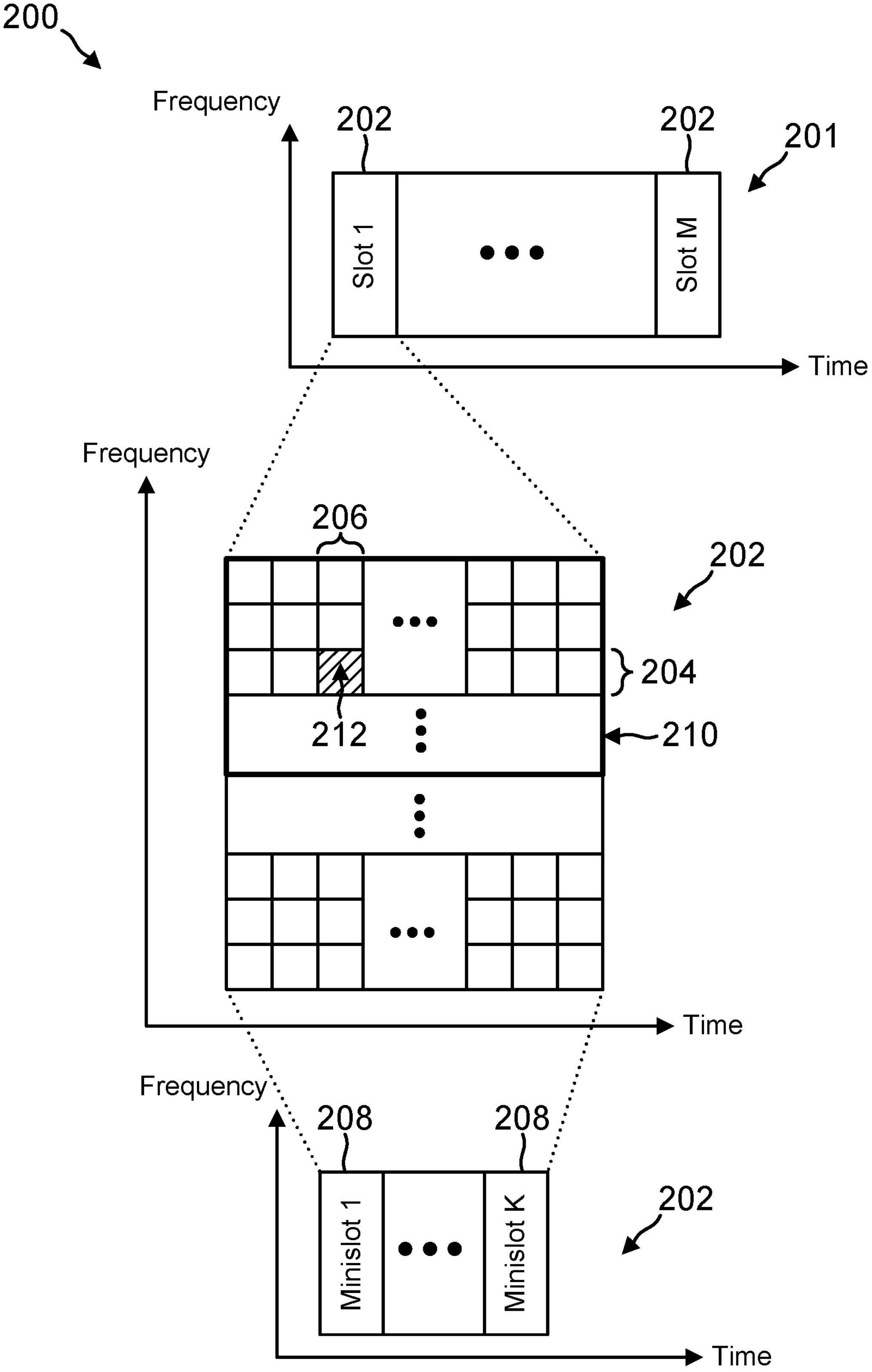
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the cyclic prefix (CP). One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a RB 210 (e.g., including about 12 subcarriers 204).

Figure 3:
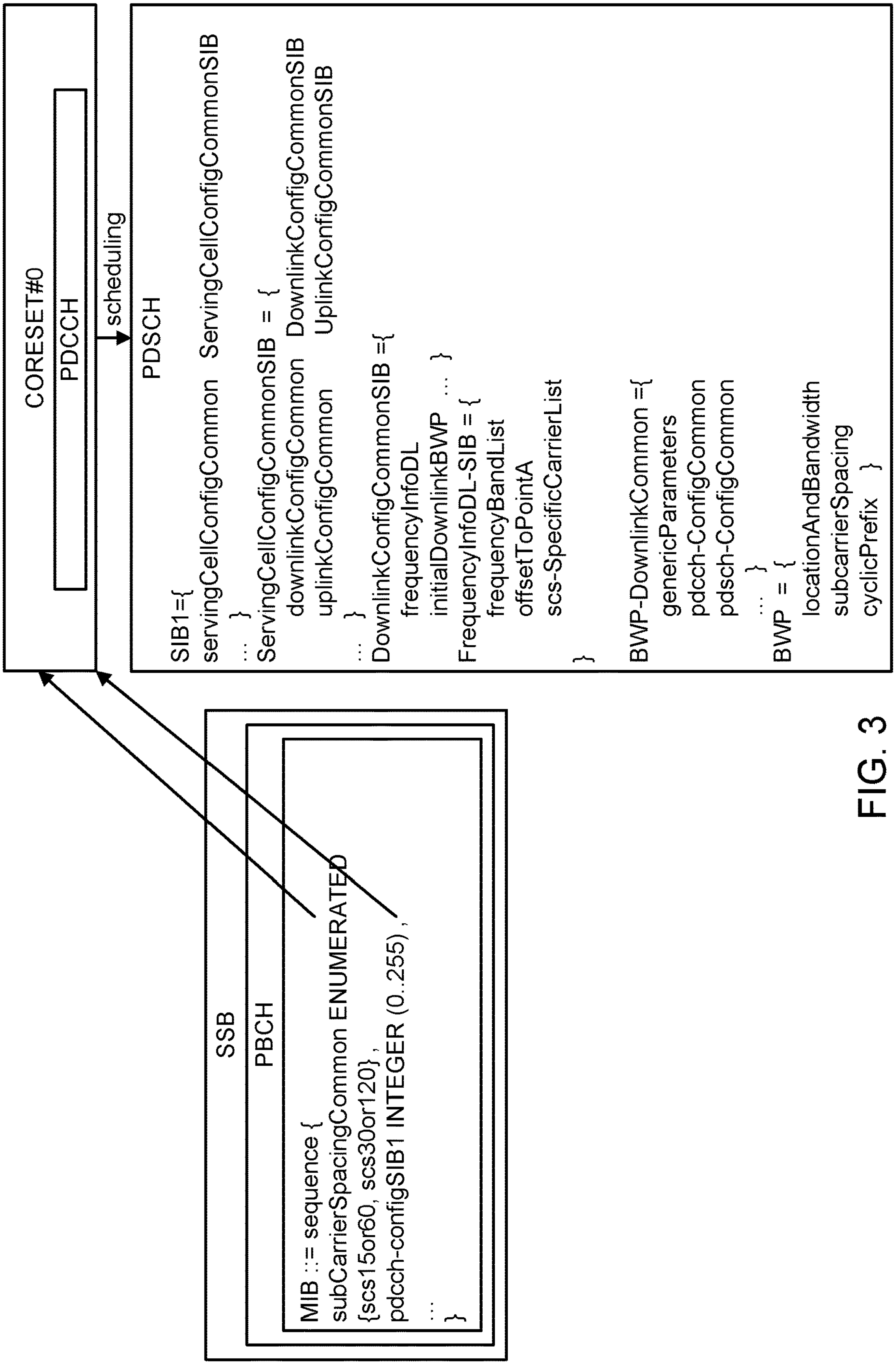
FIG. 3 illustrates a block diagram of an example SSB, according to some aspects of the present disclosure.

FIG. 3 illustrates a process of starting from an SSB to obtain the information about an initial downlink BWP and an initial uplink BWP part. In this implementation, the SSB includes a PBCH that carries MIB. A UE that receives the SSB decodes the SSB to acquire the MIB. The UE then parses the contents of the MIB, which point to a CORESET #0. The CORESET #0 includes a Physical Downlink Control Channel (PDCCH) and the PDCCH schedules system information block 1 (SIB1) on a PDSCH, and the SIB1 has information elements to identify an initial downlink BWP and an initial uplink BWP. The UE parses the contents of the SIB1, finds its initial downlink BWP and its initial uplink BWP and then uses the initial downlink BWP and uplink BWP to communicate with the BS for further configuration. For instance, the UE may communicate with the BS to be assigned a dedicated BWP on a particular beam for data transmission. Of course, some aspects of the disclosure may use a different MIB, a different CORESET #0, or a different SIB1. The SIB1 also identifies parameters relevant to numerology, such as subcarrier spacing and cyclic prefix.

Figure 4:
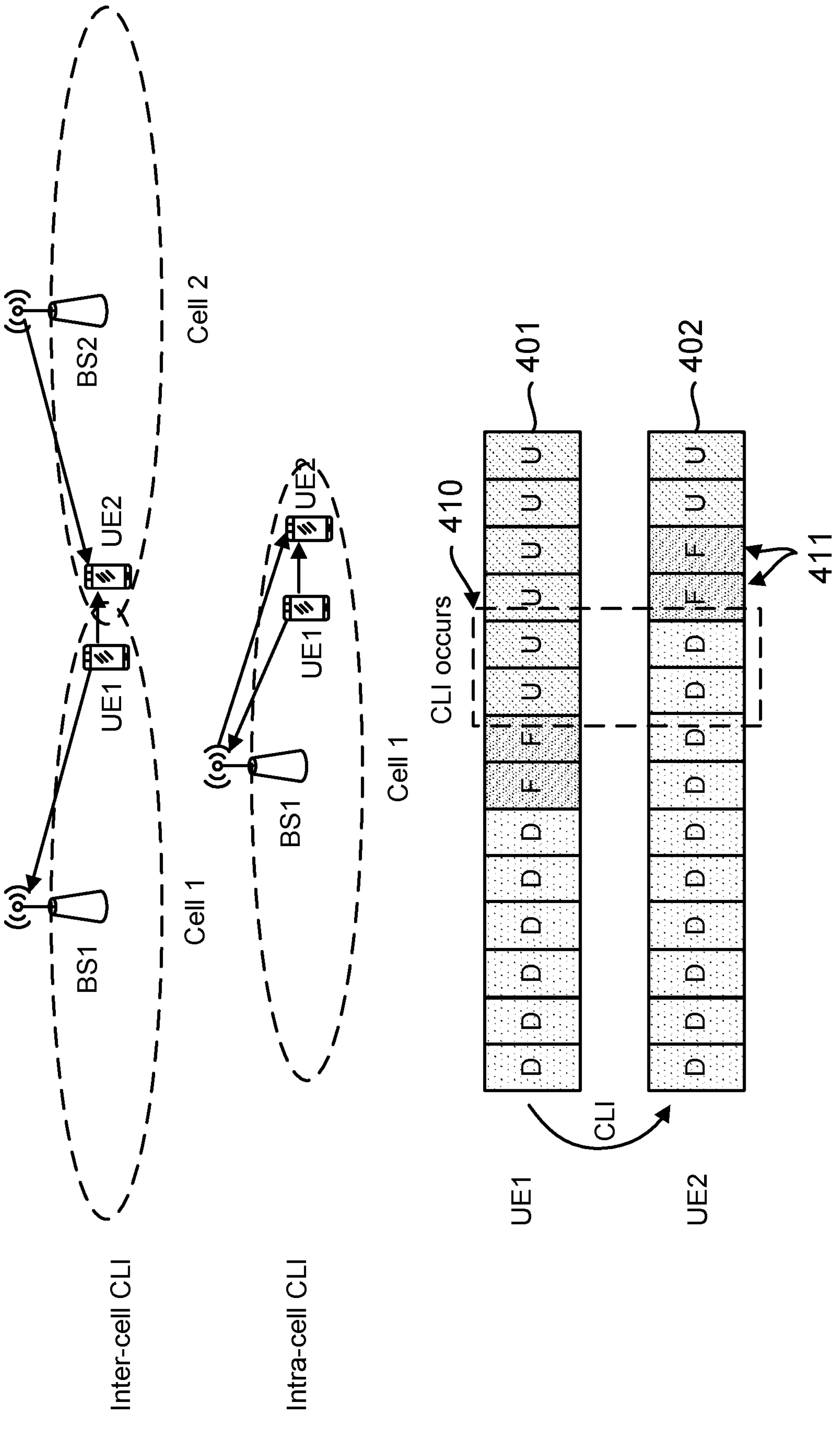
FIG. 4 is an illustration of example crosslink interference scenarios, according to some embodiments.

FIG. 4 is an illustration of example crosslink interference scenarios, according to some embodiments. The UEs and BSs of FIG. 4 may be the same as or similar to the UEs and BSs discussed above with respect to FIG. 1. In short, crosslink interference (CLI) is the interference from one UE to another nearby UE. CLI may occur when one or more networks configured different TDD UL and DL slot formats to nearby UEs. When an aggressor UE is transmitting to a base station, a victim UE may receive this transmission as interference in its DL symbols if the aggressor's UL symbol collides with at least one DL symbol of the victim UE. CLI can occur between two UEs on the same cell or on different cells.

In the "inter-cell" scenario, UE 1 is an aggressor, and its UL transmission causes interference in the downlink symbol of the victim UE, UE 2. In the "intra-cell" scenario, the aggressor UE, UE 1, and the victim UE, UE 2, are in the same cell and communicate with the same BS. Once again, the UL from UE 1 causes interference in the DL of UE 2.

FIG. 4 also includes an illustration of example interference with reference to slots 401 and 402. Slot 401 is assigned to UE 1, and slot 402 is assigned to UE 2. Each of the slots 401, 402 has a slot format. That is, the network configures which ones of the symbols within the slots 401, 402 are for DL, UL, and flexible. In FIG. 4, the symbols labeled "D" are configured for DL, the symbols labeled "U" are configured for UL, and the symbols labeled "F" are configured as flexible and may be configured at any one time for both transmission and reception. Specifically, a flexible symbol may be configured for both CLI measurement and for UL transmission, as explained in more detail below.

In the present example, CLI occurs when a UL transmission from the aggressor UE interferes with a DL reception at the victim UE, as shown by symbols 410. Either or both of the UEs 1 and 2 may measure CLI, and this example focuses on UE 2, which is the victim. UE 2 measures CLI in response to network configuration. For instance, UE 2 may measure CLI based on RRC configuration, which configures one or more CLI measurement resources. CLI measurement in this example is a Layer 3 periodic measurement to determine the presence of a jamming or interfering UE such as an UL from UE 1. For example, UE 2 may be configured with one or more Sounding Reference Signal (SRS) resources such as time-frequency resource(s), sequence(s), cyclic shift(s), periodicity, and so on to measure the UE-to-UE CLI. With regard to such measurements, SRS-Reference Signal Received Power (SRS-RSRP) and Received Signal Strength Indicator (RSSI) may be used as metrics for the CLI measurement. SRS-RSRP may include a linear average of the power contributions of the SRS to be measured over the configured resource elements within the considered measurement frequency bandwidth in the timer resources in the configured measurement occasions. RSSI may include a linear average of the total received power only in certain symbols (e.g., OFDM symbols) of the measurement time resource(s), in the measurement bandwidth and over the configured resource elements for the CLI measurement by the UE. The victim UE (UE 2) may send a measurement report to the network. Based on the CLI measurement report, the network may coordinate the scheduling of the aggressor and victim UEs to balance the UL and DL throughputs. Of course, CLI measurement is not limited to the victim UE in this example, as UE 1 may be a victim of yet another UE (not shown) and may measure and report CLI the same as or similar to UE 2.

Looking at slot 402, CLI may be RRC-configured for any of the symbols labeled D or F. UL may also be independently configured for any of the symbols labeled U or F. Therefore, in some instances, there may be a collision between CLI measurement and UL transmission in a given flexible (F) symbol. For instance, UE 2 may be RRC-configured for CLI measurement in either or both of symbols 411 and may also be either RRC-configured or dynamically (by the physical layer physical layer) scheduled or triggered for UL in either or both of symbols 411 as well. Current NR protocols may state that the UE is not expected to handle the collision between UL and CLI measurement. For instance, the UE is not expected to be configured or scheduled with PUCCH, PUSCH, and SRS in a symbol if the symbol is already configured as a CLI measurement occasion.

However, UE 1 and UE 2 in this example include hardware and/or software logic to provide different functionality. UE 1 and UE 2 in this example may de-prioritize CLI measurement over UL transmission by allowing the UE to transmit PUCCH, PUSCH, or SRS in a symbol in which CLI measurement is configured.

Figure 5:
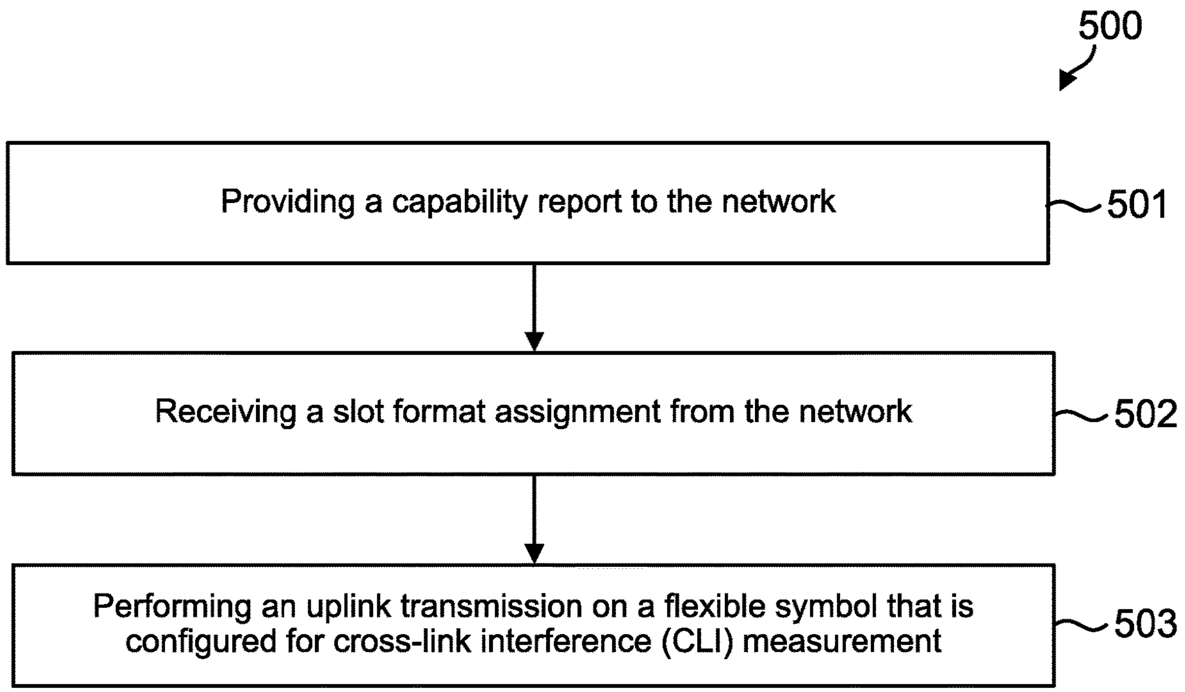
FIG. 5 is an illustration of an example method according to some aspects of the present disclosure.

FIG. 5 is an illustration of a method 500 for handling collision between UL and CLI measurement, according to one embodiment. The actions of FIG. 5 may be performed by the UE, such as any of the UEs illustrated in FIGS. 1, 4, and 10. Specifically, the actions of FIG. 5 may be performed in some instances by a processor in a UE executing computer code to perform the functionality illustrated in actions 501-503.

At action 501, the UE provides a capability report to the network. For instance, the UE may send a message to a BS of the network to inform the network that the UE supports UL transmission in a flexible symbol in which CLI reception is configured. The capability report allows the network to be able to prepare itself for UL transmissions during such flexible symbols. Action 501 may be performed during initial network access or at any other appropriate time.

In one example, the capability report indicates that within a flexible symbol, if both UE UL transmission to serving the base station (PUCCH, PUSCH or SRS) and CLI measurement are configured, scheduled or triggered, the following UE behavior is supported (one or both): Behavior 1-UE transmits the configured, scheduled or triggered UL transmission to the base station and does not measure CLI if the UE transmission is higher-layer configured or semi-statically configured. The UL transmission may include PUCCH, configured grant (CG) PUSCH, and semi-persistent (SPS) SRS in this case; and Behavior 2-UE transmits a dynamically scheduled PUSCH and SRS and does not measure CLI, such that the UE supports UL transmission of PUCCH, CG PUSCH, and SPS SRS in the flexible symbol if CLI measurement is configured in the symbol and UE supports UL transmission of dynamic PUSCH and SRS in the flexible symbol if CLI measurement is configured in the symbol.

At action 502, the UE receives a slot format assignment from the network. For instance, the format assignment be RRC-configured. Example slot formats are shown in FIG. 4, where the symbols of a slot are assigned UL, DL, or flexible. It is expected that the same slot format would be used by the UE until another slot format is assigned by RRC at a subsequent time. Action 502 may further include the network configuring CLI measurement and configuring or scheduling UL transmission on the same flexible symbol.

In some instances, the UL transmission may be higher-layer configured, including being configured by RRC or another technique and by a layer that is higher than the physical layer. For instance, the UE may receive scheduling information from the network indicating that the flexible symbol is scheduled for UL transmission. Additionally, the UE may receive scheduling information from the network indicating that the flexible symbol is scheduled for CLI measurement as well. In both cases, the UL transmission and the CLI measurement the semi-static. That is, the UL transmission and CLI measurement would be scheduled to occur in that particular flexible symbol in each slot until a subsequent higher-layer instruction to change.

In other instances, the UL transmission may be physical-layer configured, including being dynamically scheduled. For instance, the UE may request to transmit, and the network may respond with a grant instructing the UE to transmit during the flexible symbol. However, as with the example above, the particular flexible symbol is configured for CLI measurement.

At action 503, the UE performs the uplink transmission on the flexible symbol in which CLI measurement is configured.

The actions 501-503 may be repeated as appropriate. As a result of the method 500, a resource for UE UL transmission can be guaranteed even if many CLI measurement resources are configured. For example, the UL control information on PUCCH may be reliably transmitted. If the network wants the UE to measure the CLI more often, it can reduce scheduled UL transmissions in the future.

In other words, in some implementations, an advantage is that UL transmission opportunities can be guaranteed, even if much of the slot is configured for CLI measurement. This may improve operation of the UE by increasing UL throughput. Furthermore, such feature may not increase UE implementation complexity at least because it can be implemented through an existing feature that allows the UE to semi-statically determine the TX/RX direction in the flexible symbol in advance. In the case of dynamically determining the TX/RX direction, the UE is expected to be able to go from TX to RX (and vice versa) without appreciable delay because TX and RX may use separate hardware chains, and the UE may already be set up to use two separate time domain sampling timings (e.g., one for DL and one for UL and CLI). In other words, no additional timeline budget may be needed for either of the two behaviors.

Figure 6:
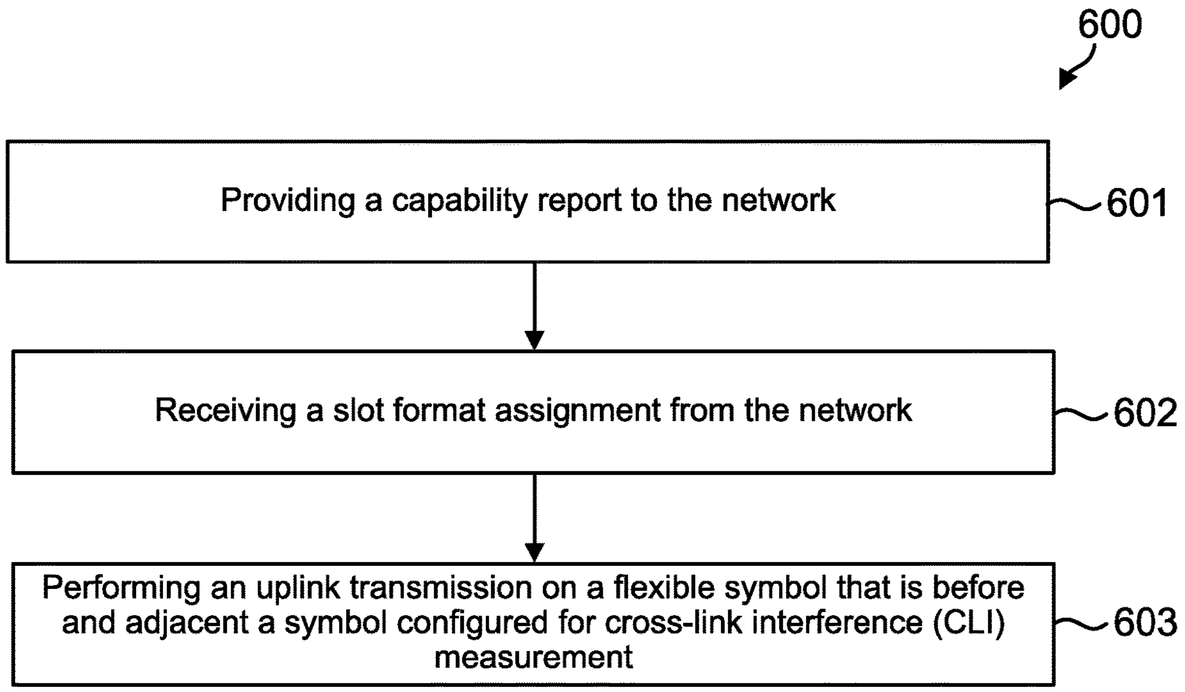
FIG. 6 is an illustration of an example method according to some aspects of the present disclosure.

FIG. 6 is an illustration of a method 600 for handling collision between UL and CLI measurement, according to one embodiment. The actions of FIG. 6 may be performed by the UE, such as any of the UEs illustrated in FIGS. 1, 4, and 10. Specifically, the actions of FIG. 6 may be performed in some instances by a processor in a UE executing computer code to perform the functionality illustrated in actions 601-603.

As noted above, some current NR protocols provide for favoring CLI measurement over UL transmission in a flexible symbol in which both CLI and UL are configured. Some current NR protocols go further than that by reserving symbols in a slot that are immediately adjacent a symbol in which CLI measurement is configured. Method 600 contradicts that position by allowing UL transmission in symbols that are before and adjacent a symbol that is used for CLI measurement.

Serving cell DL timing and CLI RX timing are considered different with a difference roughly equal to the Timing Advance (TA) of the UL's transmission to the serving base station. Such timing is based on an assumption that the victim and aggressor UEs are close to each other and that the serving cells of the victim and aggressor UEs have similar size. In practice, such assumptions usually hold well, and it holds even better for intra-cell CLI for dynamic TDD. Any timing uncertainty is usually due to serving cell size difference, but in comparison with the TA, any timing uncertainty would be expected to be small unless one cell is macro and the other cell is micro.

Figure 7:
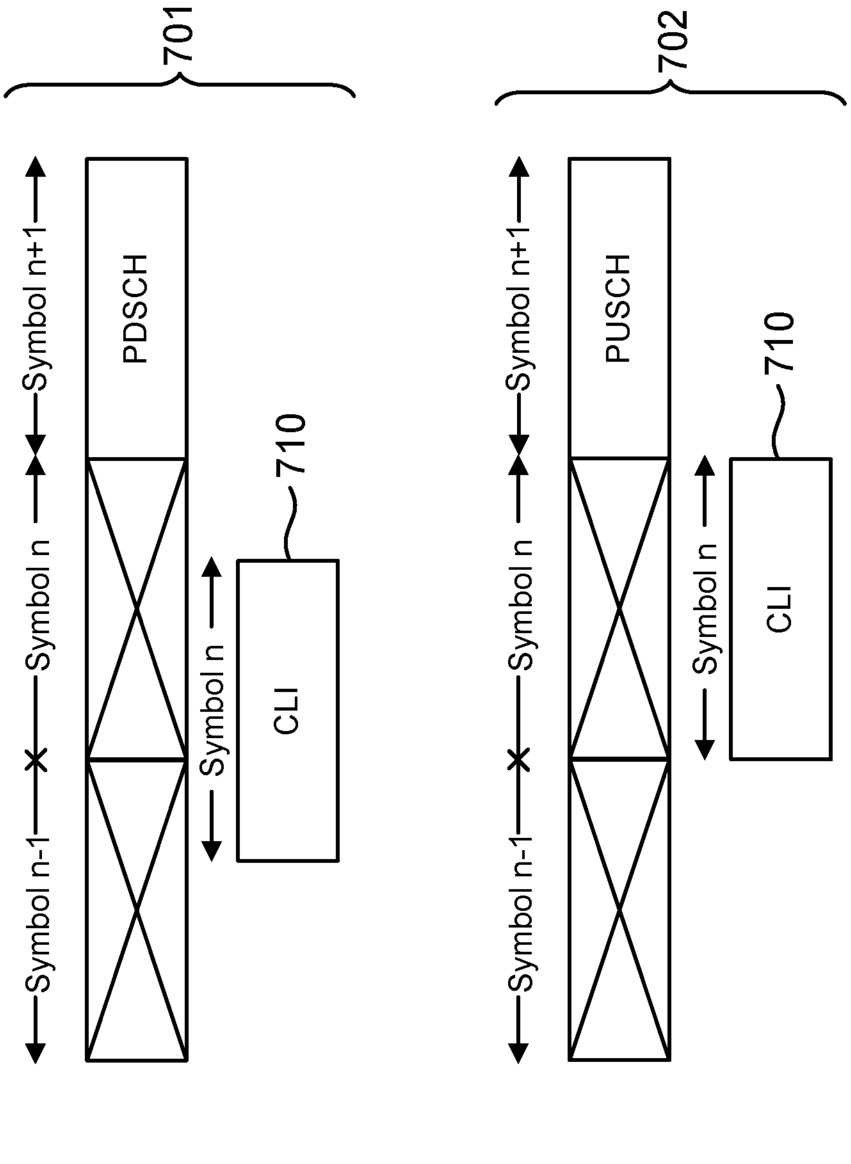
FIG. 7 is an illustration of an example slot alignment according to some aspects of the present disclosure.

An example timing advance is depicted in FIG. 7. In scenario 701, the CLI measurement symbol 710 is advanced with respect to the DL signal PDSCH. The CLI measurement symbol 710 overlaps the immediately preceding symbols n and n−1. Thus, a UE maintains at least two separate time domain sampling timings. By contrast, scenario 702 shows that CLI measurement symbol 710 is aligned with the timing of UL signal PUSCH. In scenario 702, the CLI measurement symbol 710 only overlaps symbol n but does not overlap symbol n−1.

Based on the alignment shown in scenario 702, method 600 proposes to use immediately adjacent symbols, such as symbol n (and perhaps one or more symbols preceding symbol n) for UL transmission. For instance, in a situation in which the PUSCH of scenario 702 corresponds to a flexible symbol in which CLI measurement is configured, the UE may instead perform CLI measurement rather than PUSCH but may also perform UL transmission in symbol n (and perhaps one or more symbols preceding symbol n).

Returning to FIG. 6, action 601 includes the UE providing a capability report to the network. For instance, the UE may send a message to a BS of the network to inform the network that the UE supports UL transmission in a flexible symbol before and adjacent a symbol in which CLI reception is configured. The capability report allows the network to be able to prepare itself for UL transmissions during such flexible symbols. Action 601 may be performed during initial network access or at any other appropriate time.

At action 602, the UE receives a slot format assignment from the network. Action 602 may be similar to action 502 of FIG. 5.

At action 603, the UE performs an uplink transmission on a flexible symbol that is before and adjacent a symbol configured for CLI measurement. For instance, in the scenario 702 of FIG. 7, the UE may perform CLI measurement in symbol n+1 and also perform UL transmission in symbol n and perhaps in preceding symbols as well. The UL transmission may include transmitting PUCCH/PUSCH/SRS in some examples. Note that different numerologies may have different subcarrier spacings (SCSs), such that a symbol in a 15 kHz or 30 kHz numerology may be twice as long in the time domain as a symbol in a 60 kHz or 120 kHz numerology. Therefore, some implementations may include not only not reserving the immediately preceding symbol n, but also not reserving n−1 in 60 kHz and 120 kHz numerologies when it would otherwise be appropriate to use those symbols for UL transmission.

Method 600 may be extended to take into account a timing difference between the timing of CLI measurement and UL transmission. In other words, method 600 may be extended so that the UE reports the timing difference and requests the network to reserve one or more symbols before and/after the symbol where the UE measures the CLI. Accordingly, the UE may report to the network a number of symbols (N and M) on which it is not expected to transmit PUCCH, PUSCH, and SRS before (N) and after (M) symbol (s) used for CLI measurements. The value of N and M may have a dependency on the SCS of the active BWP as the same timing difference corresponds to different number of symbols for different SCS.

For each CLI measurement, the UE may explicitly report one of the two numbers N and M, and the other number will be zero, as shown in the tables below. Of course, the tables below are just an example intended to show that the greater the subcarrier spacing the more number of symbols before or after that can be used for UL transmission. For instance, the tables below only show actionable numbers for N, but it is understood that other embodiments may use actionable numbers for M to transmit UL on symbols after the CLI measurement symbol and to leave N at zero. In other words, action 603 may include transmitting UL on adjacent symbol either before or after the symbol used for CLI measurement.

| FR1 | | | |
|---|---|---|---|
| SCS (kHz) | 15 | 30 | 60 |
| N | 1 | 1 | 2 |
| M | 0 | 0 | 0 |

| FR2 | | |
|---|---|---|
| SCS (kHz) | 160 | 120 |
| N | 1 | 2 |
| M | 0 | 0 |

The report can be included in a UL transmission, such as at action 601 or at another opportunity. For instance, the CLI report for the resource may be used in some implementations.

Furthermore, the concept of method 600 may be extended to the method 500 of FIG. 5 for prioritizing PUCCH/PUSCH/SRS over CLI. In such an instance, if the UE supports method 500, the network may interpret N and M as the number of symbols on which it is not expected to measure CLI after and before symbol(s) used for PUCCH/PUSCH/SRS transmission.

The actions 601-603 may be repeated as appropriate. As a result of the method 600, a resource for UE UL transmission can be guaranteed even if many CLI measurement resources are configured. For example, the UL control information on PUCCH may be reliably transmitted. If the network wants the UE to measure the CLI more often, it can reduce scheduled UL transmissions in the future. Furthermore, the implementation of method 600 may be accomplished in some instances without having to increase a number of time domain sample capture timings, since a timing for UL, CLI and a timing for DL may already be available to the UE.

Figure 8:
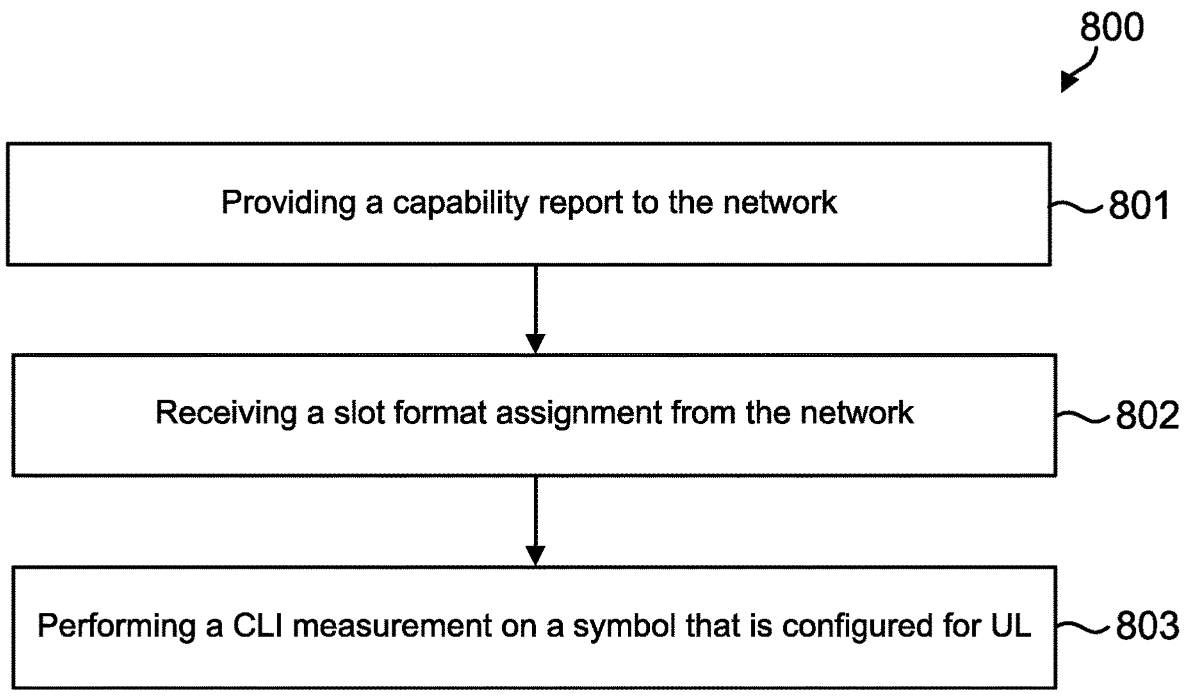
FIG. 8 is an illustration of an example method according to some aspects of the present disclosure.

While the examples below discuss increasing a number of UL transmission opportunities, various implementations may also include being flexible to increase a number of CLI measurement opportunities when appropriate. FIG. 8 is an illustration of an example method 800 for performing CLI measurement. The actions of FIG. 8 may be performed by the UE, such as any of the UEs illustrated in FIGS. 1, 4, and 10. Specifically, the actions of FIG. 8 may be performed in some instances by a processor in a UE executing computer code to perform the functionality illustrated in actions 801-803.

As discussed above at FIG. 4, within a slot, some symbols may be configured for UL, some may be configured for DL, and some may be flexible. In some instances, method 800 may be adapted to perform CLI measurement within a symbol that is configured for UL and, thus, is not configured to be flexible.

At action 801, the UE transmits information regarding its capabilities to the network. For instance, the UE may send a message to a BS of the network to inform the network that the UE supports CLI measurement in a UL symbol. The capability report allows the network to know that when a UL transmission is missed, the network should expect a CLI measurement report soon thereafter. Action 601 may be performed during initial network access or at any other appropriate time Action 802 may be the same as action 502, described above with respect to FIG. 5.

At action 803, the UE performs a CLI measurement on a symbol that is higher-layer configured for UL transmission. The UE may determine to perform the CLI measurement in response to a determination that it has little or no information to transmit. For instance, the UE may not have any user data or may not have any control information. In other words, while the symbol might have otherwise been used for PUCCH, PUSCH, or SRS, the UE may instead determine to use that symbol for CLI measurement. In another instance, the UE may determine to perform the CLI measurement in response to a determination that a number of CLI measurements has fallen below a threshold and that additional CLI measurements may be indicated. In fact, the UE may determine to perform the CLI measurement in response to any appropriate determination.

In another instance, a flexible symbol might be dynamically configured for UL transmission. In such an instance, method 800 may be adapted so that the UE may determine to instead perform CLI within the flexible symbol instead of performing UL transmission. Thus, method 800 may be applied to UL symbols as well as flexible symbols in some instances.

Method 800 may be repeated as appropriate. An advantage of method 800 may include that it allows flexibility so that a UE and a network may operate together to perform an appropriate number of UL transmissions and an appropriate number of CLI measurements according to current conditions. As noted above, in some situations a CLI measurement and a UL transmission may use a same time domain symbol capture timing and, thus, method 800 may be implemented without increasing a number of timings used.

Accordingly, techniques are discussed for performing UL transmission in symbols that would have otherwise been used for CLI measurement or would have otherwise been reserved for CLI measurement. In fact, other embodiments may include performing CLI measurements in symbols that would have otherwise been used for UL transmission. The various embodiments discussed herein may increase a number of CLI measurement opportunities and/or a number of UL transmission opportunities as appropriate for a given situation. Also, various embodiments may be implemented without additional complexity at the UE because of a UE's ability to switch from TX hardware to RX hardware and vice versa without substantial delay as well as a UE's expected use of at least two sample capture timings.

Figure 9:
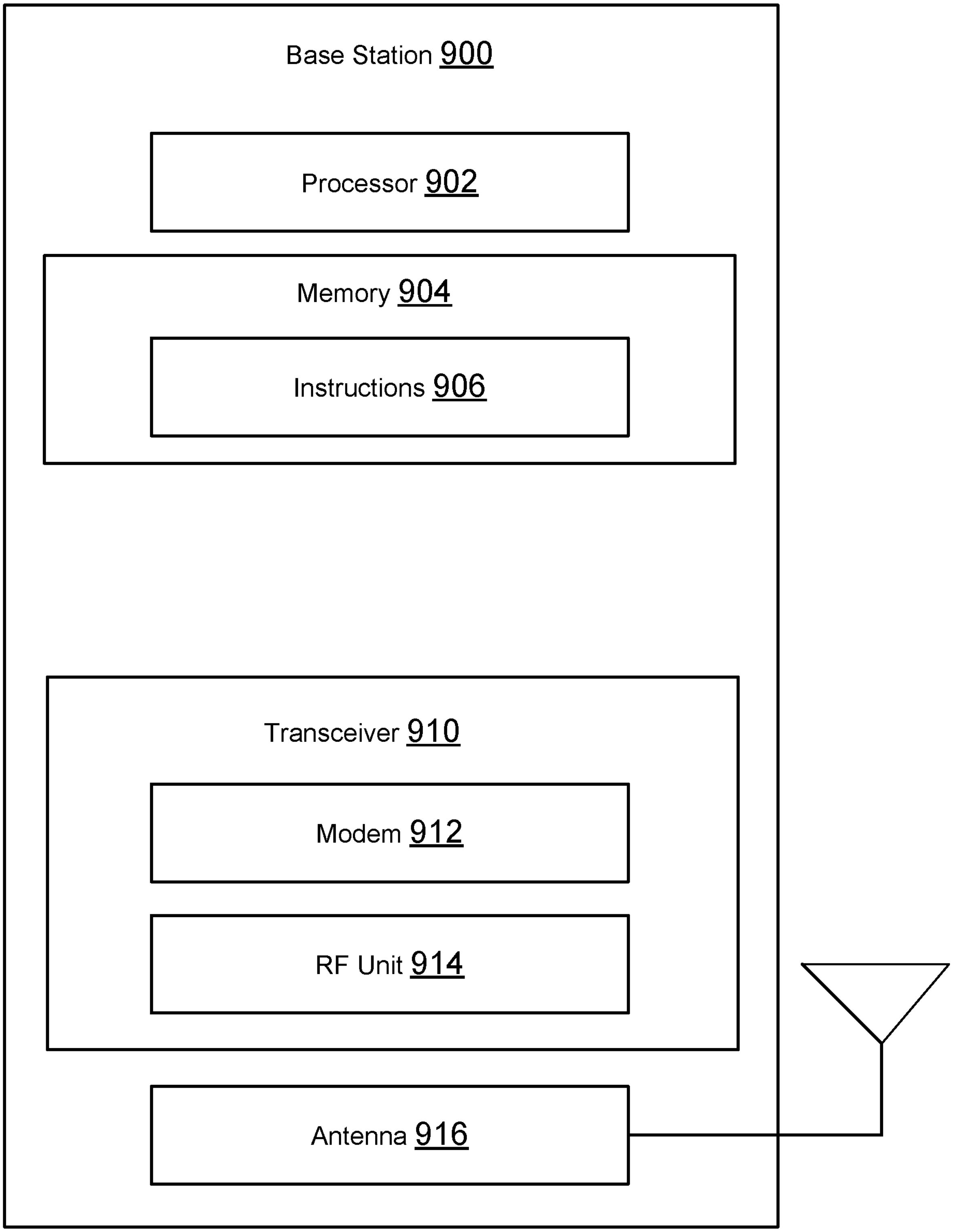
FIG. 9 is a block diagram of an exemplary base station (BS) according to some aspects of the present disclosure.

FIG. 9 is a block diagram of an exemplary BS 900 according to some aspects of the present disclosure. The BS 900 may be a BS 105 in the network 100 as discussed above in FIGS. 1 and 4. A shown, the BS 900 may include a processor 902, a memory 904, a transceiver 910 including a modem subsystem 912 and a RF unit 914, and one or more antennas 916. These elements may be in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 904 may include a non-transitory computer-readable medium. The memory 904 may store instructions 906. The instructions 906 may include instructions that, when executed by the processor 902, cause the processor 902 to cause the other components of the base station 900 to communicate with the UE 1000, such as by transmitting configurations and the like, and actions described above with respect to FIGS. 1 and 4. Instructions 906 may also be referred to as code, which may be interpreted broadly to include any type of computer-readable statement(s) as discussed below with respect to FIG. 10.

As shown, the transceiver 910 may include the modem subsystem 912 and the RF unit 914. The transceiver 910 can be configured to communicate bi-directionally with other devices, such as the UEs 115 and/or another core network element. The modem subsystem 912 may be configured to modulate and/or encode data according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., SSBs, RMSI, MIB, SIB, frame based equipment-FBE configuration, PRACH configuration PDCCH, PDSCH) from the modem subsystem 912 (on outbound transmissions) or of transmissions originating from another source such as a UE 115, the node 315, and/or BS 900. The RF unit 914 may be further configured to perform analog beamforming in conjunction with the digital beamforming. Although shown as integrated together in transceiver 910, the modem subsystem 912 and/or the RF unit 914 may be separate devices that are coupled together at the BS 105 to enable the BS 105 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may be similar to the antennas of the BS 105 discussed above. This may include, for example, transmission of information to complete attachment to a network and communication with a camped UE 115 according to some aspects of the present disclosure. The antennas 916 may further receive data messages transmitted from other devices and provide the received data messages for processing and/or demodulation at the transceiver 910. The transceiver 910 may provide the demodulated and decoded data (e.g., PUCCH control information, PRACH signals, PUSCH data) to the processor 902 for processing. The antennas 916 may include multiple antennas of similar or different designs in order to sustain multiple transmission links.

In an aspect, the BS 900 can include multiple transceivers 910 implementing different RATs (e.g., NR and LTE). In an aspect, the BS 900 can include a single transceiver 910 implementing multiple RATs (e.g., NR and LTE). In an aspect, the transceiver 910 can include various components, where different combinations of components can implement different RATs.

Figure 10:
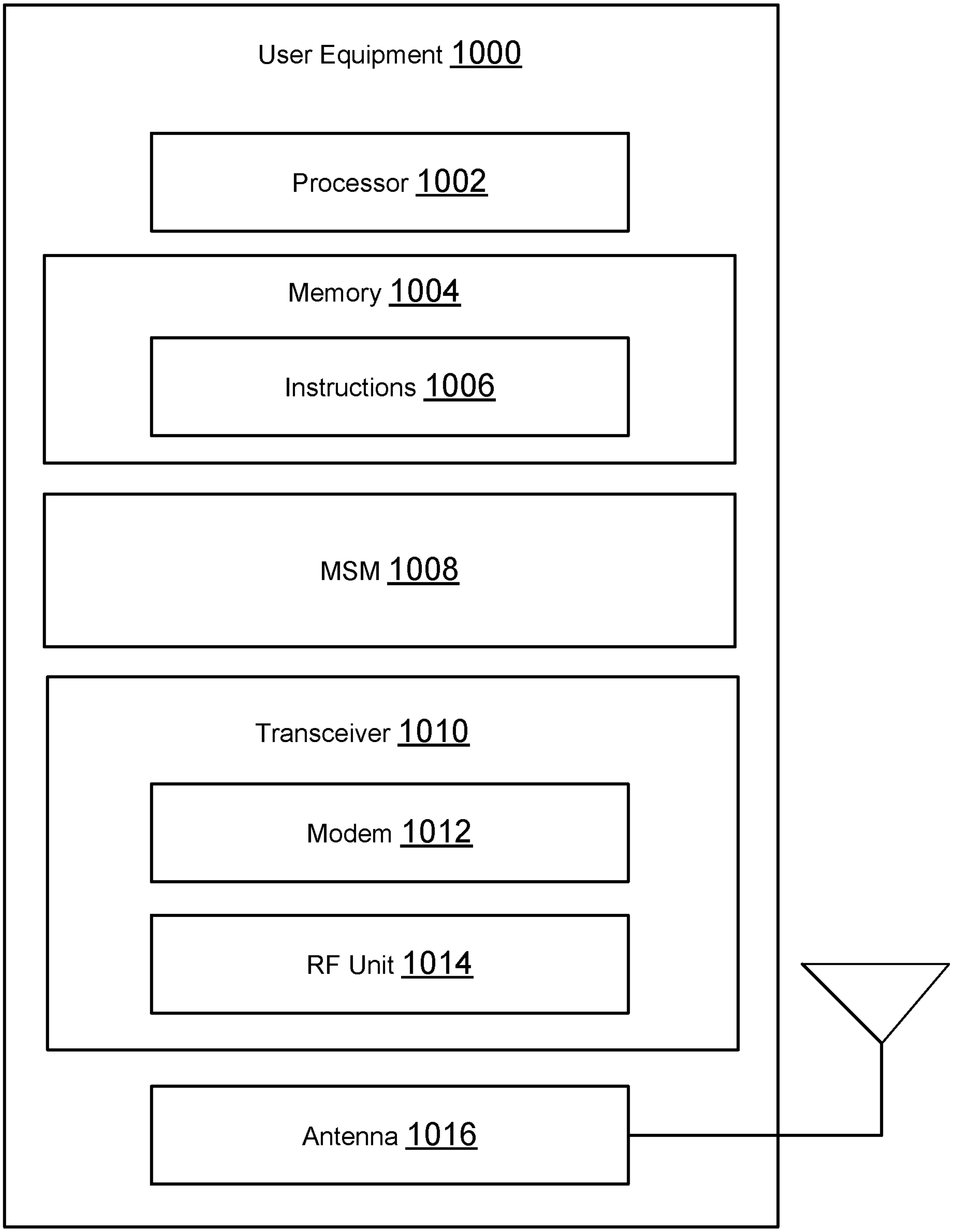
FIG. 10 is a block diagram of a user equipment (UE) according to some aspects of the present disclosure.

FIG. 10 is a block diagram of an exemplary UE 1000 according to some aspects of the present disclosure. The UE 1000 may be a UE 115 or UE 215 as discussed above in FIGS. 1 and 4. As shown, the UE 1000 may include a processor 1002, a memory 1004, a MultiSim module 1008, a transceiver 1010 including a modem subsystem 1012 and a radio frequency (RF) unit 1014, and one or more antennas 1016. These elements may be coupled with one another. The term "coupled" may refer to directly or indirectly coupled or connected to one or more intervening elements. For instance, these elements may be in direct or indirect communication with each other, for example via one or more buses.

The processor 1002 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration. The processor 1002 may correspond to the application processor (AP) discussed above, upon which OS 311 (and HLOS 911) runs.

The memory 1004 may include a cache memory (e.g., a cache memory of the processor 1002), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1004 includes a non-transitory computer-readable medium. The memory 1004 may store, or have recorded thereon, instructions 1006. The instructions 1006 may include instructions that, when executed by the processor 1002, cause the processor 1002 to perform the operations described herein with reference to a UE 115 in connection with aspects of the present disclosure, for example, aspects of FIGS. 1-8. Instructions 1006 may also be referred to as code, which may include any type of computer-readable statements.

The MultiSim module 1008 may be implemented via hardware, software, or combinations thereof. For example, the MultiSim module 1008 may be implemented as a processor, circuit, and/or instructions 1006 stored in the memory 1004 and executed by the processor 1002.

In some aspects, the MultiSim module 1008 may include multiple SIMs or SIM cards (e.g., 2, 3, 4, or more). Each SIM may be configured to store information used for accessing a network, for example, to authenticate and identify the UE 1000 as a subscriber of the network. Some examples of information stored on a SIM may include, but not limited to, a subscriber identity such as an international mobile subscriber identity (IMSI) and/or information and/or key used to identify and authenticate the UE 1000 in a certain provider network. In some aspects, the UE 1000 may have a first subscription on a first SIM of the multiple SIMs and a second subscription on a second SIM of the multiple SIMs. The first subscription may identify the UE 1000 by a first subscriber identity, and the second subscription may identify the UE 1000 by a second subscriber identity.

As shown, the transceiver 1010 may include the modem subsystem 1012 and the RF unit 1014. The transceiver 1010 can be configured to communicate bi-directionally with other devices, such as the BSs 105 and 500.

The modem subsystem 1012 may be configured to modulate and/or encode the data from the memory 1004 and the MultiSim module 1008 according to a modulation and coding scheme (MCS), e.g., a low-density parity check (LDPC) coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data (e.g., PUSCH data, PUCCH UCI, MSG1, MSG3, etc.) or of transmissions originating from another source such as a UE 115, a BS 105, or an anchor. The RF unit 1014 may be further configured to perform analog beamforming in conjunction with the digital beamforming. Although shown as integrated together in transceiver 1010, the modem subsystem 1012 and the RF unit 1014 may be separate devices that are coupled together at the UE 1000 to enable the UE 1000 to communicate with other devices.

The RF unit 1014 may provide the modulated and/or processed data, e.g. data packets (or, more generally, data messages that may contain one or more data packets and other information), to the antennas 1016 for transmission to one or more other devices. The antennas 1016 may further receive data messages transmitted from other devices. The antennas 1016 may provide the received data messages for processing and/or demodulation at the transceiver 1010. The transceiver 1010 may provide the demodulated and decoded data (e.g., RRC configurations, MIB, PDSCH data and/or PDCCH DCIs, etc.) to the MultiSim module 1008 for processing. The antennas 1016 may include multiple antennas of similar or different designs in order to sustain multiple transmission links.

In an aspect, the UE 1000 can include multiple transceivers 1010 implementing different RATs (e.g., NR and LTE). In an aspect, the UE 1000 can include a single transceiver 1010 implementing multiple RATs (e.g., NR and LTE). In an aspect, the transceiver 1010 can include various components, where different combinations of components can implement different RATs.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

Implementation examples are described in the following numbered clauses:

1. A method of wireless communication performed by a user equipment (UE), the method comprising:
receiving an assigned slot format from a network, the slot format including a plurality of symbols, a first subset of the symbols being designated for uplink, a second subset of the symbols being designated for downlink, and a third subset of the symbols being designated as flexible; and
performing an uplink transmission on a first symbol of the third subset, wherein the first symbol of the third subset is configured for crosslink interference (CLI) measurement.
2. The method of clause 1, wherein the slot format is configured by radio resource control (RRC) signaling
3. The method of clauses 1-2, wherein the first symbol of the third subset is: semi-statically scheduled for uplink by radio resource control (RRC) signaling.
4. The method of clause 1, wherein the uplink transmission is dynamically scheduled.
5. The method of clause 4, further comprising:
sending a scheduling request to the network, including requesting to perform the uplink transmission; and
receiving a grant from the network to perform the uplink transmission.
6. The method of clauses 1-6, wherein the uplink transmission includes at least one item selected from a list consisting of:
a physical UL control channel (PUCCH) signal;
a physical UL shared channel (PUSCH) signal; and
a sounding reference signal (SRS).
7. The method of clause 1, wherein the third subset is scheduled for CLI measurement by radio resource control (RRC) signaling.
8. The method of clauses 1 and 7, further comprising: providing a capability report to the network, the capability report comprising an indication that the UE supports the uplink transmission for a physical UL control channel (PUCCH), a physical UL shared channel (PUSCH), and a sounding reference signal (SRS) in the first symbol of the third subset.
9. The method of clauses 1 and 4-5, further comprising: providing a capability report to the network, the capability report comprising an indication that the UE supports the uplink transmission for a dynamic occurrence of a physical UL shared channel (PUSCH) and a sounding reference signal (SRS) in the first symbol of the third subset.
10. A user equipment (UE) comprising:
a transceiver configured to communicate with a network; and
a processor configured to interface with the transceiver, wherein the processor is further configured to:
receive an assigned slot format from the network, the slot format including a plurality of symbols, a first subset of the symbols being designated for uplink, a second subset of the symbols being designated for downlink, and a third subset of the symbols being designated as flexible; and
perform an uplink transmission on a first symbol of the third subset, wherein the first symbol of the third subset is before and adjacent a second symbol that is configured for crosslink interference (CLI) measurement.
11. The UE of clause 10, wherein the processor is further configured to report to the network a capability to transmit on the first symbol.
12. The UE of clauses 10-11, wherein the processor is further configured to report to the network a number of symbols before the second symbol on which the UE is capable of uplink transmission.
13. The UE of clause 12, wherein the processor is further configured to report to the network a number of symbols after the second symbol on which the UE is capable of uplink transmission.
14. The UE of clauses 10-13, wherein the processor is further configured to perform a subsequent uplink transmission according to a subsequent slot format, wherein the subsequent uplink transmission is performed after and adjacent a flexible symbol that is scheduled for CLI measurement.
15. The UE of clauses 10-14, wherein the second symbol is configured for CLI measurement by radio resource control (RRC) signaling.
16. A user equipment (UE) comprising:
means for communicating wirelessly with a network; and
means for controlling the communicating means, wherein controlling means further includes:
means for receiving an assigned slot format from the network, the slot format including a plurality of symbols, a first subset of the symbols being designated for uplink, a second subset of the symbols being designated for downlink, and a third subset of the symbols being designated as flexible; and
means for performing a crosslink interference (CLI) measurement on a first symbol of the first subset.
17. The UE of clause 16, wherein the UE is not configured, scheduled, or triggered to transmit a signal during the first symbol of the first subset.

18. The UE of clauses 16-17, further comprising means for reporting to the network a capability to perform the CLI measurement on the first symbol of the first subset.

19. The UE of clauses 16-18, wherein the means for performing the CLI measurement includes means for determining that a number of CLI measurement opportunities has dropped below a threshold.

20. The UE of clauses 16-19, wherein the slot format is configured by radio resource control (RRC) signaling.

21. The UE of clauses 16-20, wherein the means for performing the CLI measurement include means for transmitting a CLI measurement report to the network on a second symbol of the first subset subsequent to the first symbol of the first subset.

22. A non-transitory computer-readable medium having program code recorded thereon, the program code comprising:

code for receiving an assigned slot format from a network, the slot format including a plurality of symbols, a first subset of the symbols being designated for uplink, a second subset of the symbols being designated for downlink, and a third subset of the symbols being designated as flexible;

code for receiving information from the network configuring a first symbol of the third subset for crosslink interference (CLI) measurement; and code for performing an uplink transmission on the first symbol of the third subset.

23. The non-transitory computer-readable medium of clause 22, wherein the slot format is configured by radio resource control (RRC) signaling.

24. The non-transitory computer-readable medium of clauses 22-23, wherein the first symbol of the third subset is: semi-statically scheduled for uplink.

25. The non-transitory computer-readable medium of clause 22, wherein the uplink transmission is dynamically scheduled.

26. The non-transitory computer-readable medium of clause 25, further comprising: code for sending a scheduling request to the network, including requesting to perform the uplink transmission; and code for receiving a grant from the network to perform the uplink transmission.

27. The non-transitory computer-readable medium of clauses 22-26, wherein the uplink transmission includes at least one item selected from a list consisting of:

a physical UL control channel (PUCCH) signal;

a physical UL shared channel (PUSCH) signal; and a sounding reference signal (SRS).

28. The non-transitory computer-readable medium of clause 22, wherein the third subset is scheduled for CLI measurement by radio resource control (RRC) signaling.

29. The non-transitory computer-readable medium of clauses 22 and 28, further comprising:

code for providing a capability report to the network, the capability report comprising an indication that a UE supports the uplink transmission for a physical UL control channel (PUCCH), a physical UL shared channel (PUSCH), and a sounding reference signal (SRS) in the first symbol of the third subset.

30. The non-transitory computer-readable medium of clauses 22 and 25-26, further comprising:

code for providing a capability report to the network, the capability report comprising an indication that a UE supports the uplink transmission for a dynamic occurrence of a physical UL shared channel (PUSCH) and a sounding reference signal (SRS) in the first symbol of the third subset.

What is claimed is:

1. A method of wireless communication performed by a user equipment (UE), the method comprising:

receiving an assigned slot format from a network, the slot format including a plurality of symbols, a first subset of the symbols being designated for uplink, a second subset of the symbols being designated for downlink, and a third subset of the symbols being designated as flexible; and performing a crosslink interference (CLI) measurement on a first symbol of the first subset based on a determination that a number of CLI measurement opportunities has fallen below a threshold.

2. The method of claim 1, wherein the slot format is configured by radio resource control (RRC) signaling.

3. The method of claim 1, wherein a first symbol of the third subset is: semi-statically scheduled for uplink by radio resource control (RRC) signaling.

4. The method of claim 1, further comprising:

performing an uplink transmission on a first symbol of the third subset, wherein the first symbol of the third subset is configured for CLI measurement, wherein the uplink transmission is dynamically scheduled.

5. The method of claim 4, further comprising:

sending a scheduling request to the network, including requesting to perform an uplink transmission; and receiving a grant from the network to perform the uplink transmission.

6. The method of claim 1, further comprising:

performing an uplink transmission on a first symbol of the third subset, wherein the first symbol of the third subset is configured for CLI measurement, wherein the uplink transmission includes at least one item selected from a list consisting of:

a physical UL control channel (PUCCH) signal;

a physical UL shared channel (PUSCH) signal; and a sounding reference signal (SRS).

7. The method of claim 1, wherein the third subset is scheduled for CLI measurement by radio resource control (RRC) signaling.

8. The method of claim 1, further comprising: providing a capability report to the network, the capability report comprising an indication that the UE supports an uplink transmission for a physical UL control channel (PUCCH), a physical UL shared channel (PUSCH), and a sounding reference signal (SRS) in the first symbol of the third subset.

9. The method of claim 1, further comprising: providing a capability report to the network, the capability report comprising an indication that the UE supports an uplink transmission for a dynamic occurrence of a physical UL shared channel (PUSCH) and a sounding reference signal (SRS) in the first symbol of the third subset.

10. A user equipment (UE) comprising:

one or more antennas; and a processing system that includes one or more processors and one or more memories that store code for the one or more processors, the processing system configured to cause the UE to:

receive an assigned slot format from a network, the slot format including a plurality of symbols, a first subset of the symbols being designated for uplink, a second subset of the symbols being designated for downlink, and a third subset of the symbols being designated as flexible; and perform a crosslink interference (CLI) measurement on a first symbol of the first subset based on a determination that a number of CLI measurement opportunities has fallen below a threshold.

11. The UE of claim 10, wherein the processing system is configured to cause the UE to report to the network a capability to transmit on the first symbol.

12. The UE of claim 10, wherein the processing system is configured to cause the UE to report to the network a number of symbols before a second symbol that is configured for CLI measurement on which the UE is capable of uplink transmission.

13. The UE of claim 12, wherein the processing system is configured to cause the UE to report to the network a number of symbols after the second symbol on which the UE is capable of uplink transmission.

14. The UE of claim 10, wherein the processing system is further configured to cause the UE to perform a subsequent uplink transmission according to a subsequent slot format, wherein the subsequent uplink transmission is performed after and adjacent a flexible symbol that is scheduled for CLI measurement.

15. The UE of claim 10, wherein a second symbol is configured for CLI measurement by radio resource control (RRC) signaling.

16. A user equipment (UE) comprising:

means for communicating wirelessly with a network; and means for controlling the means for communicating, wherein the means for controlling further includes:

means for receiving an assigned slot format from the network, the slot format including a plurality of symbols, a first subset of the symbols being designated for uplink, a second subset of the symbols being designated for downlink, and a third subset of the symbols being designated as flexible; and means for performing a crosslink interference (CLI) measurement on a first symbol of the first subset based on a determination that a number of CLI measurement opportunities has fallen below a threshold.

17. The UE of claim 16, wherein the UE is not configured, scheduled, or triggered to transmit a signal during the first symbol of the first subset.

18. The UE of claim 16, further comprising means for reporting to the network a capability to perform the CLI measurement on the first symbol of the first subset.

19. The UE of claim 16, wherein the means for performing the CLI measurement includes means for determining that the number of CLI measurement opportunities has dropped below the threshold.

20. The UE of claim 16, wherein the slot format is configured by radio resource control (RRC) signaling.

21. The UE of claim 16, wherein the means for performing the CLI measurement include means for transmitting a CLI measurement report to the network on a second symbol of the first subset subsequent to the first symbol of the first subset.

22. A non-transitory computer-readable medium having program code recorded thereon, the program code comprising:

code for receiving an assigned slot format from a network, the slot format including a plurality of symbols, a first subset of the symbols being designated for uplink, a second subset of the symbols being designated for downlink, and a third subset of the symbols being designated as flexible; and code for performing a crosslink interference (CLI) measurement on a first symbol of the first subset based on a determination that a number of CLI measurement opportunities has fallen below a threshold.

23. The non-transitory computer-readable medium of claim 22, wherein the slot format is configured by radio resource control (RRC) signaling.

24. The non-transitory computer-readable medium of claim 22, wherein the first symbol of the third subset is: semi-statically scheduled for uplink.

25. The non-transitory computer-readable medium of claim 22, further comprising:

code for performing an uplink transmission on a first symbol of the third subset, wherein the first symbol of the third subset is configured for CLI measurement, wherein the uplink transmission is dynamically scheduled.

26. The non-transitory computer-readable medium of claim 25, further comprising:

code for sending a scheduling request to the network, including requesting to perform an uplink transmission; and code for receiving a grant from the network to perform the uplink transmission.

27. The non-transitory computer-readable medium of claim 22, further comprising:

code for performing an uplink transmission on a first symbol of the third subset, wherein the first symbol of the third subset is configured for CLI measurement, wherein the uplink transmission includes at least one item selected from a list consisting of:

a physical UL control channel (PUCCH) signal;

a physical UL shared channel (PUSCH) signal; and a sounding reference signal (SRS).

28. The non-transitory computer-readable medium of claim 22, wherein the third subset is scheduled for CLI measurement by radio resource control (RRC) signaling.

29. The non-transitory computer-readable medium of claim 22, further comprising:

code for providing a capability report to the network, the capability report comprising an indication that a UE supports an uplink transmission for a physical UL control channel (PUCCH), a physical UL shared channel (PUSCH), and a sounding reference signal (SRS) in the first symbol of the third subset.

30. The non-transitory computer-readable medium of claim 22, further comprising:

code for providing a capability report to the network, the capability report comprising an indication that a UE supports an uplink transmission for a dynamic occurrence of a physical UL shared channel (PUSCH) and a sounding reference signal (SRS) in the first symbol of the third subset.

* * * * *